United States Patent [19]

van den Berg

[11] 4,028,293

[45] June 7, 1977

[54] METHOD FOR PREPARING MATERIALS CONTAINING MINERALS AND SYNTHETIC SUBSTANCES, MATERIALS MANUFACTURED ACCORDING TO SAID METHOD AND OBJECTS CONSISTING OF SAID MATERIALS

[75] Inventor: Antoon J. van den Berg, Epe, Netherlands

[73] Assignees: Hollandsche Wegenbouw Zanen B.V.; Olster Asphalt Fabriek B.V., both of Netherlands

[22] Filed: Sept. 29, 1975

[21] Appl. No.: 617,625

[30] Foreign Application Priority Data

Apr. 19, 1973 Netherlands ............... 7305619

[52] U.S. Cl. .................. 260/28.5 AS; 260/2.3; 260/28.5 A; 260/28 R; 404/17
[51] Int. Cl.² ............... C08L 23/06; C08L 95/00
[58] Field of Search ............ 260/2.3, 28, 28.5 AS, 260/42.46; 404/17

[56] References Cited

UNITED STATES PATENTS

| | | | |
|---|---|---|---|
| 3,112,681 | 12/1963 | Gessler | 260/42.46 |
| 3,336,252 | 8/1967 | Raichle et al. | 260/42.46 |

FOREIGN PATENTS OR APPLICATIONS 307,960  6/1973  Austria

*Primary Examiner*—Wilbert J. Briggs, Sr.
*Attorney, Agent, or Firm*—Sughrue, Rothwell, Mion, Zinn & Macpeak

[57] ABSTRACT

A building or road construction material, and method for its formation, which comprises (1) mineral components such as sand, gravel, diminuted glass, etc., (2) polymeric components such as polyethylene, polypropylene, polyvinyl chloride, polystyrene, etc., and (3) a hydrocarbon-containing component such as tar pitch, bituminous products, petroleum coke, etc. According to the method of the invention the mineral component is first heated to a temperature of at least 180° C and then mixed with the polymeric component in diminutive form, and then to this resulting mixture is added the hydrocarbon component. The final mixture is then allowed to cool to form the desired product.

5 Claims, No Drawings

METHOD FOR PREPARING MATERIALS CONTAINING MINERALS AND SYNTHETIC SUBSTANCES, MATERIALS MANUFACTURED ACCORDING TO SAID METHOD AND OBJECTS CONSISTING OF SAID MATERIALS

This invention relates to a method for preparing a material consisting of mineral components, polymeric components and a third component, according to which, prior to the addition of the third component, the pre-heated mineral components are mixed with the polymeric components, as well as to material obtained according to said method.

Such a method is known from the Netherlands patent application 71.08690. This patent application relates to the preparation of bituminous compositions which also contain mineral aggregates and a polymer and which are suitable to be used in road constructions. In this case the use of the polymer aims at improving the rheological properties of bitumina. The polymer used must have a special character, namely a synthetic rubber of the block copolymer type having the general formula A-B-A, in which A and B represent different thermoplastic non-elastomeric polymer blocks, for example polystyrene-polyisoprene-polystyrene, and for preparing the bituminous compositions it is mixed with the bituminous component in the presence of at least part of the mineral aggregate. According to the said patent application this mixing may be effected in various ways:

a. Adding the block copolymer to a mixture of the bituminous component and the mineral aggregate.
b. Mixing the block copolymer with the total amount of mineral aggregate, before the bituminous component is added.
c. Mixing the block copolymer with part of the mineral aggregate, whereupon the rest of the mineral aggregate is added, before the bituminous component heated to 135°–185° C is added. The total amount of aggregate can be previously dried at an increased temperature, for example 200° C.
d. Mixing the block copolymer with part of the mineral aggregate and adding said mixture of the bituminous component and the rest of the mineral aggregate.

In these mixing methods the block copolymer is used as a powder or as a solution in a volatile solvent. The amount of block copolymer used amounts to 1 to 20% by weight calculated on the amount of bituminous component. The amount of block copolymer plus bituminous component amounts to 1 to 15% by weight calculated on the quantity of mineral aggregate. Therefore the polymeric component is present in an amount of at most 1 to 5 calculated on the bituminous component, which means a considerable excess of bituminous components relative to the polymeric components.

The Netherlands patent application 69.00269 describes a method for preparing a material by mixing preheated mineral components with 10–25% by weight of waste plastics and heating the mixture to a temperature at least equal to the melting temperature of the components of the waste plastics having the highest melting point. It is required that the plastic components are thermoplastic resins in which minor amounts of thermosetting resins may be present. These materials may be used for purposes of building and/or road constructions and hydraulic engineering.

It is a object of the present invention to provide a method for the manufacture of materials for purposes of building and/or road constructions and hydraulic engineering, according to which in addition to mineral components both the diminuted polymeric components, for example as diminuted waste material, and components containing hydrocarbons, for example bituminous products, are used and is therefore not directed to an improvement of bituminous compositions. With a view to obtaining materials having satisfactory working properties and good mechanical properties it has been found that in preparing the materials according to the invention it is required first to heat the mineral components to a temperature of at least 180° C subsequently to add non-heated polymeric components in diminuted form and thereafter to add the components consisting of hydrocarbons. It has also been found that with the method according to the invention it is required to use the components containing the hydrocarbons in an amount of at most 100% by weight, calculated on the amount by weight of the polymeric components.

The combination of the special method and the ratio of the composing components surprisingly leads to materials with unexpected favourable properties.

With respect to the method to be used it is to be noted that exclusively the method according to the invention, according to which first the mineral components are heated, subsequently the non-heated polymeric components in diminuted form and finally the components containing the hydrocarbons are added leads to materials having said favourable properties. In the examples of comparison mentioned below the results are elucidated when one partially deviates from the method according to the invention. In example of comparison I no components containing hydrocarbons are used; in example of comparison II the mineral components are not preheated; in example of comparison III coarse polymeric components are used; in example of comparison IV preheated diminuted polymeric components are used; in example of comparison V first the preheated mineral components are mixed with the components containing the hydrocarbons before the polymeric components are added; and in example of comparison VI the preheated mineral components are mixed with a mixture of hot components containing hydrocarbons and diminuted polymeric components.

In the present invention one may add as mineral components all components suitable for the purposes of application of the materials. For road constructions and building purposes sand and mixtures of sand and gravel are preferred. However, for certain applications the sand may be replaced entirely, for the greater part or to a minor extent by diminuted glass, for example originating from industries working waste, slags originating from blast furnaces, metallurgical works and refuses incinerators etc.

As polymeric components mainly thermoplastic polymers, for example polyethylene, polypropylene, polybutylene, polyvinyl chloride, polyamides, thermoplastic polyesters, polyacrylates etc. are used. The origin of said polymeric components is not important, provided these constituents are or become diminuted. Therefore the polymeric components as for instance granulated manufactured raw materials, intentionally diminuted raw materials or waste products of the polymer production may be used. For example from an environmental point of view, however, the so-called domestic waste plastics are of particular importance. Said waste products, which due to its difficult disintegration cannot be or hardly be removed from the environment, may be processed into useful products by means of the method according to the invention. The only condition is that the waste plastics are reduced to relatively small dimensions. Naturally said waste plastics consist of a great number of different synthetic substances the greater part of which, however, are thermoplastic resins. A relatively low percentage of thermosetting resins is no objection for the processing since said thermosetting resins are incorporated as fillers. Small percentages of other products present by chance are no objection either.

With respect to the shape and the dimensions of the diminuted polymeric components it is to be noted that the shape is of minor importance so that consequently scales, granules, pellets, coarse millings, scrap and cut or broken pieces efficiently may be used and that the dimensions may also vary to a large extent, mostly depending of the aimed application.

The amount of the polymeric components to be used vary from 2% to 30% by weight, calculated on the amount by weight of the mineral components, depending on the properties desired in the final product, such as wear resistance, elasticity, ruggedness, stability, bending strength, tensile strength and compression strength, heat and sound insulating capacity and the like. Depending on the application aimed the content of polymeric components may be greater or smaller. For road constructions in general percentages of from 4H % to 10% by weight are satisfactory.

Materials for which high standards are set as to heat and sound insulation contain at least 15% by weight of polymeric components.

As components containing hydrocarbons for example tar pitch products rich in aromatics, bituminous tar pitch products, oil and waxlike products rich in aromatics, petroleum coke, light petroleum fractions rich in aromatics, so-called synthetic bitumen, styrene and the like are used. The question of which products will be used depends again on the object in view. For road constructions generally the usual bituminous products are used. For coloured materials in general no bituminous products or as little as possible are used, since the pigmenting will be interfered.

The component containing hydrocarbons to be used amounts at most 100% by weight, preferably however 20%–60% by weight, calculated on the amount by weight of polymeric components.

Furthermore it is possible to include the usual fillers and/or additives in the materials. As already previously stated pigments may be applied as additives. Depending on their nature the fillers and additives are added to the mineral component or to the polymeric component. It is for example obvious to add thermosetting resins acting as a filler together with the polymeric component.

The materials produced according to the method of the invention excel in special properties. As is apparent from the examples I and II materials suitable for road pavements having a Marshall stability of at least 1500 and 2000 kg. respectively at 60° C and a compression strength according to the Proctor method of at least 80 kg/cm² are obtained. For the purpose of comparison it is to be noted that under the same conditions sand-asphalt has a Marshall stability >100, gravel-asphalt a Marshall stability of 200–500 kg. and open asphalt concrete a Marshall stability of 500–1000 kg.

It has been found furthermore that the percentages of components containing hydrocarbons and of polymeric components, and also their relation to one another are of great importance for the mechanical properties. A surprising abrupt improvement of the compression strength appears if certain minimum percentages and relations to one another of the previously stated components are exceeded; (see table)

| | Composition in % | | Compression strength |
|---|---|---|---|
| Sand | polyethylene | bitumen | in kg/cm² |
| 100 | 2 | 1 | 11.8 |
| 100 | 4 | 1 | 17.4 |
| 100 | 6 | 1 | 87.4 |
| 100 | 8 | 1 | 90.3 |
| 100 | 2 | 2 | 17.3 |
| 100 | 4 | 2 | 92.3 |
| 100 | 6 | 2 | 90.0 |
| 100 | 8 | 2 | 88.9 |

From this table it appears that for obtaining certain mechanical properties an optimum composition of the material exists which may be different for each application and mostly should be established experimentally. One may therefore influence the properties of the final material to a great extent by the selection of the various components and their quantities.

In example I there is described a material consisting of sand, polyethylene and bitumen and in example III a material consisting of sand, PVC and bitumen. The values between the values of the Marshall stability and the compression strength of both examples can be obtained by replacing the suitable amount of polyethylene by PVC.

The mixing times required for preparing road construction materials according to the invention are particularly short. When using 4% by weight of polyethylene shreds a mixing time of 15 seconds suffices.

An additional advantage of the method according to the invention is the fact that no special apparatus is required. The apparatus used for example in road constructions is used.

The materials obtained according to the present invention can be used in road constructions, both for underlayers and toplayers, for all kinds of roads, ridgy areas near traffic-lights, parking lots, bus-stops and marking strips in various colours and in the building industry for floors and floor tiles in factories and buildings, doorstep tiles, footway bands, wall tiles and wall plates, heat and sound insulating plates, sewers and sewer pipes, also in the chemical industry.

EXAMPLE I 1 ton of sand is heated in a mixing chamber to 230° C and while continuously stirring 40 kg. of non-heated diminuted (shredded) polyethylene is added and mixed during 15 seconds. Subsequently, while continuing the mixing 20 kg. of bitumen preheated to 160° C is added to this mixture. After 30 seconds of mixing the product is ready for transportation and is applied on the spot by hand or with the spreader machine as a road pavement and finished by a number of roller runs. At the working up the temperature may decrease to 130° C. without a deterioration of the properties of the final product.

Properties:

Marshall stability, measured at 60° C (according to the standards of the Ministry of Public Works 1972), 1500 to 2500 kg. Compression strength determined with cylinders according to the Proctor method (according to the standards of the Ministry of Public Works) 80–90 kg/cm².

EXAMPLE II

The processing is carried out according to the method of example I, however, instead of 1 ton of sand a mixture of 600 kg of sand and 400 kg of gravel is used.

The product obtained is more suitable to be worked up, has a greater Marshall stability and a higher compression strength than the product according to example I.

EXAMPLE III

An amount of sand is heated to at most 200° C. and 6% by weight of diminuted polyvinyl chloride, calculated on the amount of sand is added, while continuously stirring and after a homogeneous mixture is obtained 2% by weight of bitumen are still added.

The final products obtained from this mixture present Marshall stabilities which according to the requirements of the Ministry of Public Works correspond with those of sand-asphalt mixtures, however, with compression strengths which are considerably higher than those of sand-asphalt mixtures.

EXAMPLE IV

If the afore-mentioned examples are polymeric as polystyrene or polyacrylates or at temperatures of at least 260° C polyamides or polyesters are used, similar results are obtained as well.

EXAMPLE V

If the same compositions of the preceding examples are used, however, the amount of polymeric components are increased to for example 10% by weight, calculated on the amount by weight of sand, it is possible to manufacture factory floors, floor plates and tiles having better properties than the road surfaces of the preceding examples. In this manner compressed tiles can be produced having compression strengths of 200 kg/cm².

EXAMPLE OF COMPARISON I

Sand is heated to 200°–250° C and 4% to 10% by weight of non-heated diminuted polyethylene, calculated on the amount of sand is added. The result is a mixture which cannot be worked up or can hardly be worked up to a road surface. The temperature range for applying the material is too short and rolling produces at once permanent cracks.

EXAMPLE OF COMPARISON II

Cold sand is mixed with diminuted polymeric components and this mixture is heated to 200°–250° C. There is no binding or an insufficient binding, the mixture falls apart and therefore has only bad mechanical properties.

EXAMPLE OF COMPARISON III

Heated sand is mixed with large pieces of waste plastics. Some binding results but only with difficulty.

EXAMPLE OF COMPARISON IV

Heated sand is mixed with diminuted polymeric components which before mixing are heated to the softening point. No satisfactory mixing results and therefore also no or insufficient cohesion.

EXAMPLE OF COMPARISON V

Heated sand is mixed with bitumen and subsequently diminuted polymeric components are added while continuously stirring. No satisfactory mixing results, the mixture accumulates to lumps.

EXAMPLE OF COMPARISON VI

Heated sand is mixed with a mixture of hot bitumen and diminuted polymeric components. No satisfactory mixing is obtained and the results are distinctly worse than those of the examples I–V.

EXAMPLE OF COMPARISON VII

Heated sand is mixed with diminuted thermosetting polymeric components. No binding results and the thermosetting resin may burn at too high temperatures.

I claim:
1. A method of preparing a material consisting essentially of a mineral component, a polymeric component, and bitumen, said method comprising sequentially
   1. heating a mineral component to a temperature of at least 180° C;
   2. mixing with the heated mineral component of (1) a thermoplastic polymeric component, said polymeric component being in diminutive form and in an amount of 2 to 30% by weight, calculated on the amount by weight of the mineral component;
   3. mixing with said mixture of (2) the bitumen which has been previously heated, said heated bitumen being used in an amount of 40% to 60% by weight, calculated on the amount by weight of said polymeric component; and
   4. allowing the material product of (3) to cool.
2. A method of preparing a material consisting essentially of a mineral component comprising sand or a mixture of sand and gravel, a polymeric component, and bitumen, said method comprising sequentially
   1. heating said mineral component to a temperature of at least 180° C;
   2. mixing with the heated mineral component of (1) a thermoplastic polymeric component, said polymeric component comprising diminutive polyethylene in an amount of 4% by weight, calculated on the amount by weight of said mineral component;
   3. mixing with said mixture of (2) the bitumen which has been previously heated, said heated bitumen being used in an amount of 2% by weight, calculated on the amount by weight of said mineral component; and
   4. allowing the material product of (3) to cool.
3. A method of preparing a material consisting essentially of a mineral component comprising sand or a mixture of sand and gravel, a polymeric component, and bitumen, said method comprising sequentially
   1. heating said mineral component to a temperature of at least 180° C;
   2. mixing with the heated mineral component of (1) a thermoplastic polymeric component, said polymeric component comprising diminutive polyethylene in an amount of 6% by weight, calculated on the amount by weight of said mineral component;
   3. mixing with said mixture of (2) the bitumen which has been previously heated, said heated bitumen being used in an amount of 1% by weight, calculated on the amount by weight of said mineral component; and
   4. allowing the material product of (3) to cool.
4. The material prepared by the method of claim 2.
5. The material prepared by the method of claim 3.

* * * * *